US006892843B2

(12) United States Patent
Schillaci et al.

(10) Patent No.: US 6,892,843 B2
(45) Date of Patent: May 17, 2005

(54) VEHICLE HOOD SAFETY PROP

(75) Inventors: Nicholas Schillaci, Ancaster (CA); Iiija Tunjic, Hamilton (CA)

(73) Assignee: Dofasco Inc., Hamilton (CA)

( * ) Notice: Subject to any disclaimer, the term of this patent is extended or adjusted under 35 U.S.C. 154(b) by 125 days.

(21) Appl. No.: 10/400,881

(22) Filed: Mar. 28, 2003

(65) Prior Publication Data

US 2003/0183434 A1 Oct. 2, 2003

Related U.S. Application Data

(60) Provisional application No. 60/368,322, filed on Mar. 29, 2002, and provisional application No. 60/395,986, filed on Jul. 16, 2002.

(51) Int. Cl.[7] ................................................ B62D 25/12

(52) U.S. Cl. ............... 180/69.21; 180/274; 296/187.04; 296/193.11

(58) Field of Search ............................ 180/69.21, 69.1, 180/274, 281; 296/203.02, 187.04, 193.11

(56) References Cited

U.S. PATENT DOCUMENTS

| | | | | | |
|---|---|---|---|---|---|
| 313,836 | A | | 3/1885 | Plumb | |
| 1,654,878 | A | | 1/1928 | Holler et al. | |
| 1,757,021 | A | | 5/1930 | Remondino | |
| 2,193,111 | A | * | 3/1940 | Peterson | 292/217 |
| 2,193,112 | A | * | 3/1940 | Peterson | 292/214 |
| 3,754,614 | A | * | 8/1973 | Habas | 180/69.21 |
| 4,012,807 | A | | 3/1977 | Kern | |
| 4,069,550 | A | * | 1/1978 | Silk et al. | 16/361 |
| 4,206,944 | A | | 6/1980 | Kumagai et al. | |
| 4,436,330 | A | | 3/1984 | Mayo et al. | |
| 4,482,023 | A | | 11/1984 | Dziedzic et al. | |
| 4,530,412 | A | * | 7/1985 | Sigety, Jr. | 180/69.21 |
| 4,611,680 | A | | 9/1986 | Redenbarger et al. | |
| 4,629,146 | A | | 12/1986 | Lymons | |
| 4,991,675 | A | * | 2/1991 | Tosconi et al. | 180/69.21 |
| 5,136,752 | A | * | 8/1992 | Bening et al. | 16/287 |
| 5,306,053 | A | | 4/1994 | Gurusami et al. | |
| 5,411,109 | A | | 5/1995 | Orns | |
| 5,435,406 | A | | 7/1995 | Gaffoglio et al. | |
| 5,577,452 | A | | 11/1996 | Yindra | |
| 5,611,584 | A | | 3/1997 | Giese et al. | |
| 5,806,619 | A | * | 9/1998 | Kleinhoffer et al. | 180/69.2 |
| 6,213,235 | B1 | | 4/2001 | Elhardt et al. | |
| 6,217,108 | B1 | | 4/2001 | Sasaki | |
| 6,347,818 | B1 | | 2/2002 | Lyons, Sr. | |
| 6,371,231 | B1 | | 4/2002 | Nushii et al. | |
| 6,394,211 | B1 | | 5/2002 | Palenchar et al. | |
| 6,415,882 | B1 | | 7/2002 | Schuster et al. | |
| 6,439,330 | B1 | * | 8/2002 | Paye | 180/69.21 |
| 6,453,511 | B2 | | 9/2002 | Sato | |
| 6,755,268 | B1 | * | 6/2004 | Polz et al. | 180/69.21 |
| 2003/0010552 | A1 | * | 1/2003 | Kim | 180/69.21 |
| 2003/0075371 | A1 | * | 4/2003 | Haun | 180/69.21 |
| 2003/0121710 | A1 | * | 7/2003 | Hamada et al. | 180/274 |

FOREIGN PATENT DOCUMENTS

| | | |
|---|---|---|
| DE | 197 44 494 A1 | 4/1999 |
| JP | 06219330 | 9/1994 |
| JP | 2001-55170 | 2/2001 |

* cited by examiner

*Primary Examiner*—Christopher P. Ellis
*Assistant Examiner*—J. Allen Shriver
(74) *Attorney, Agent, or Firm*—Ingrid E. Schmidt

(57) ABSTRACT

A prop assembly for temporarily supporting a closure panel in an extended position removed from a body opening has a rigid elongated prop which has one end hinged to either a closure hinge coupling the closure panel to the body or directly to the closure panel. The other end of the prop slides in a guide slot formed in a bracket mounted to the body and is captured in a detent formed in a proximal end of the guide slot to retain the closure panel in the extended position. The prop assembly allows an operator to move the closure panel to an extended position which is secure with a single motion using only one hand.

6 Claims, 10 Drawing Sheets

NOTE: HOOD HAS BEEN REMOVED FOR CLARITY

VEHICLE HOOD SAFETY PROP

FIELD OF THE INVENTION

This invention relates to props used for supporting a closure panel in an extended position removed from an opening and in particular to closure panels such as lids, or hoods for closing an opening formed in a vehicle body such as a trunk or engine compartment. It will however be understood that the invention will likewise find application for propping other types of closure panels, for example hinged closure panels for storage containers.

BACKGROUND OF THE INVENTION

It is common practice to provide a closure panel such as a hood for closing a vehicle engine compartment, the hood being hinged to the vehicle body for movement between an extended position removed from the engine compartment and a retracted position where the hood closes the engine compartment to protect it from weather, dirt and debris. In the extended position, the hood provides access to the engine compartment for maintenance and inspection of the engine compartment and it is therefore required to provide means for supporting the hood in such an extended position. Commonly, a prop is fixed at one end to the vehicle body adjacent to the engine compartment and has a free end which is selectively engaged with a portion of the vehicle hood, such as a receiving aperture.

One problem which is associated with vehicle hoods is that the operator must have one hand free to raise and support the hood in the extended position until the free end of the prop is engaged in the receiving aperture by another hand. Another problem which arises is that the prop is not positively located in the hood and if it becomes disengaged by a sudden movement of the vehicle, vibration or wind, the hood will suddenly be released and close the compartment, and perhaps injure an operator.

One of the objects of this invention is to provide a prop assembly which will alleviate these problems and advantageously, may also be less expensive to manufacture than conventional hood props and be lighter, thereby improving the combustion fuel efficiency for the vehicle.

SUMMARY OF THE INVENTION

In accordance with this invention, there is provided a prop assembly for temporarily supporting a closure panel in an extended position removed from an opening, the closure panel and a body defining said opening being coupled by a closure hinge, the prop assembly having a rigid elongated prop having a hinged end for coupling to one of said closure hinge and closure panel, and a free end slidable in a guide slot. The guide slot has a distal end and a proximal end to guide said free end of the prop as the free end slides between said distal end of the slot and the proximal end of the slot when the closure panel is moved between a retracted position closing the opening and an extended position removed from the opening, respectively. The proximal end of the guide slot has a downwardly extending detent adapted to capture the free end of the prop in the extended position of the closure panel.

In a preferred embodiment, the guide slot is formed in a bracket mounted to the body and consists of a plate having opposite ends mounted flush with the body and an intermediate portion which is spaced from the body. The intermediate portion has the guide slot formed therein and the free end of the prop has an enlarged termination which is captured between the bracket and the body.

BRIEF DESCRIPTION OF THE DRAWINGS

In order that the invention may be more clearly understood, a preferred embodiment is described below with reference being made to the accompanying drawings, in which.

DESCRIPTION OF PREFERRED EMBODIMENT WITH REFERENCE TO DRAWINGS

Figure 1:
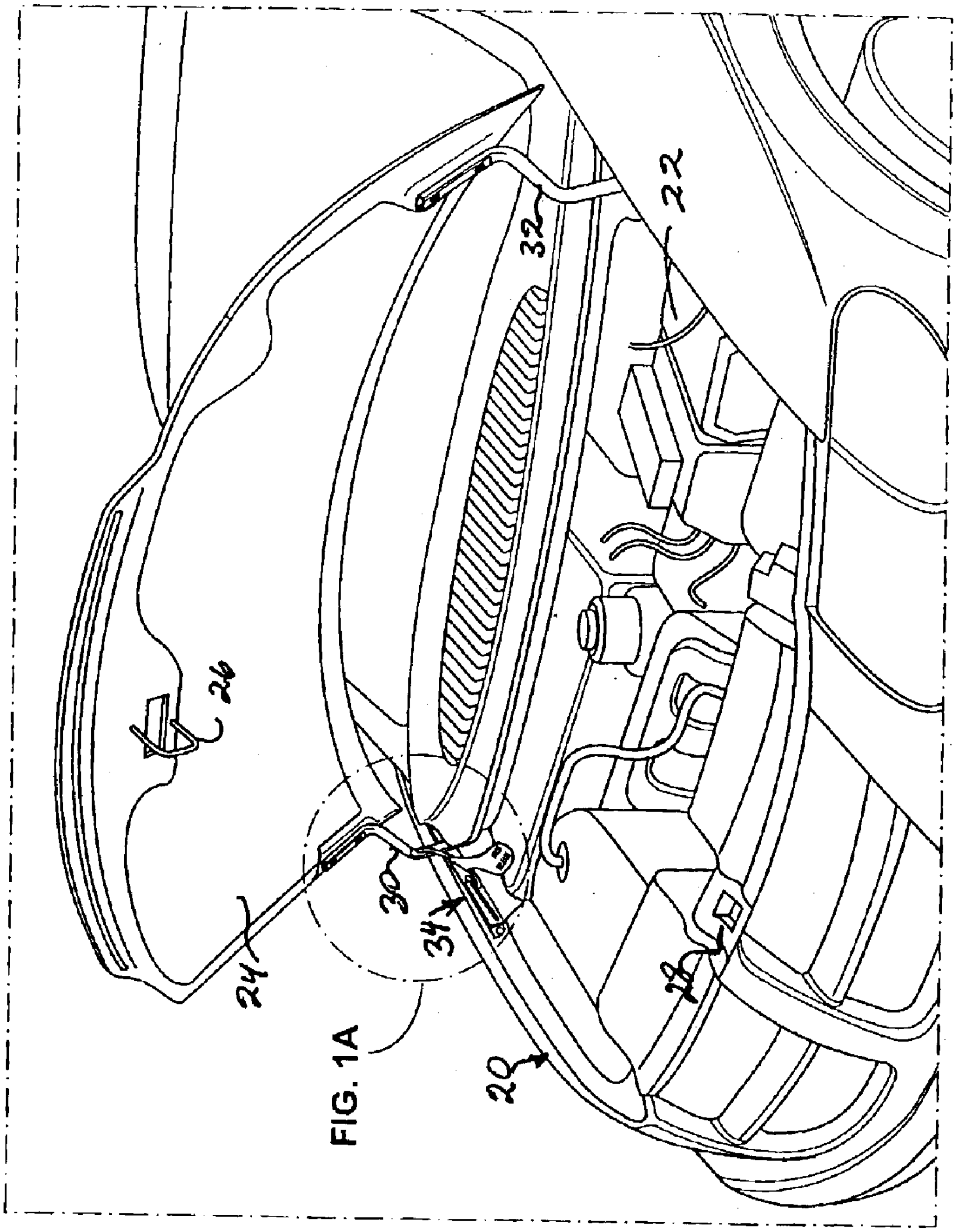
FIG. 1 is a perspective view of a vehicle with the hood in an extended position and supported by a prop assembly made in accordance with the invention.
Figure 1A:
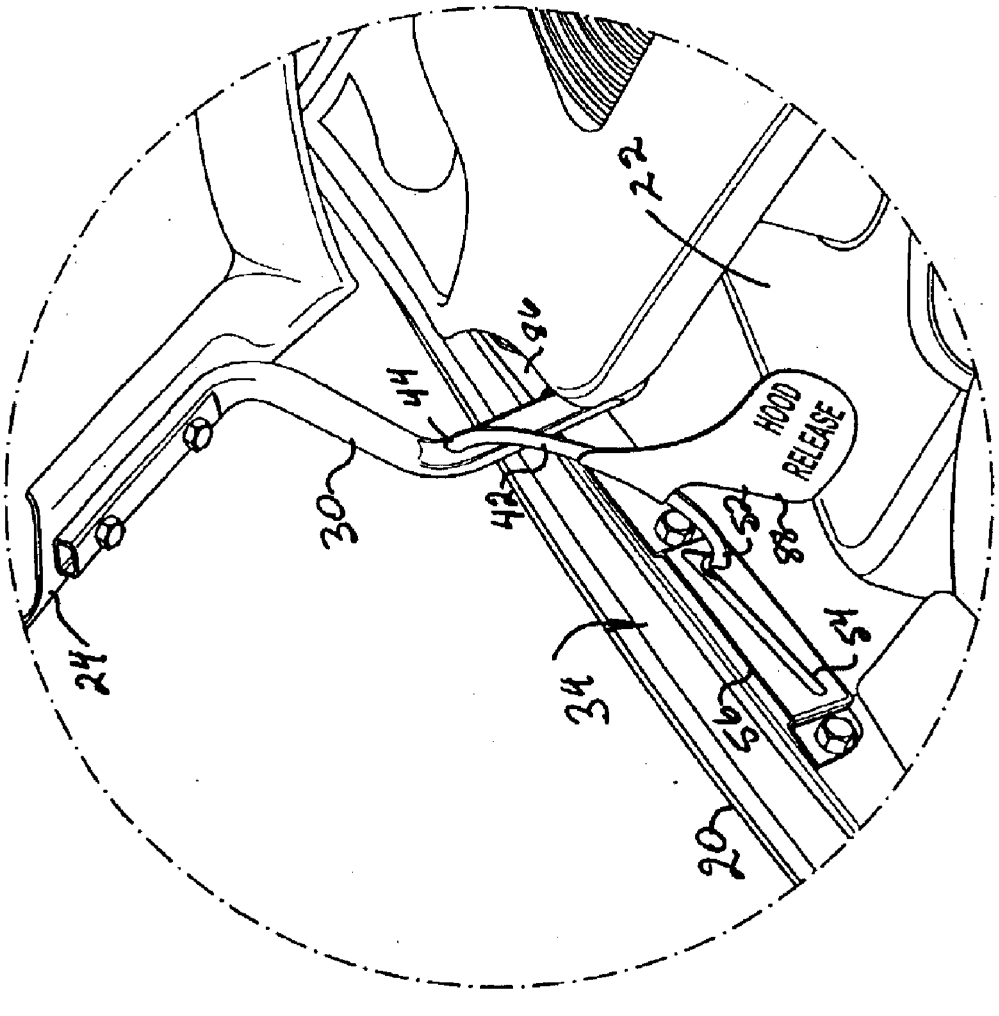
FIG. 1*a* is a perspective view drawn to a larger scale of circled area 1*a* of FIG. 1.

The body of a transportation vehicle generally indicated by reference numeral 20 is shown in FIG. 1. The body 20 defines an opening 22 for an engine compartment which is selectively closed by a closure panel in the form of a hood assembly 24. It will be seen that the hood assembly 24 has a hasp 26 at a forward edge which is adapted to be clasped in a receiving aperture 28 formed at the forward edge of the body 20. The hood assembly 24 is coupled to the body 20 by means of a pair of closure hinges 30, 32 each disposed at respective sides of the hood assembly. A hood prop assembly associated with the closure hinge 30 and made in accordance with the invention is generally indicated by reference numeral 34.

Figure 2:
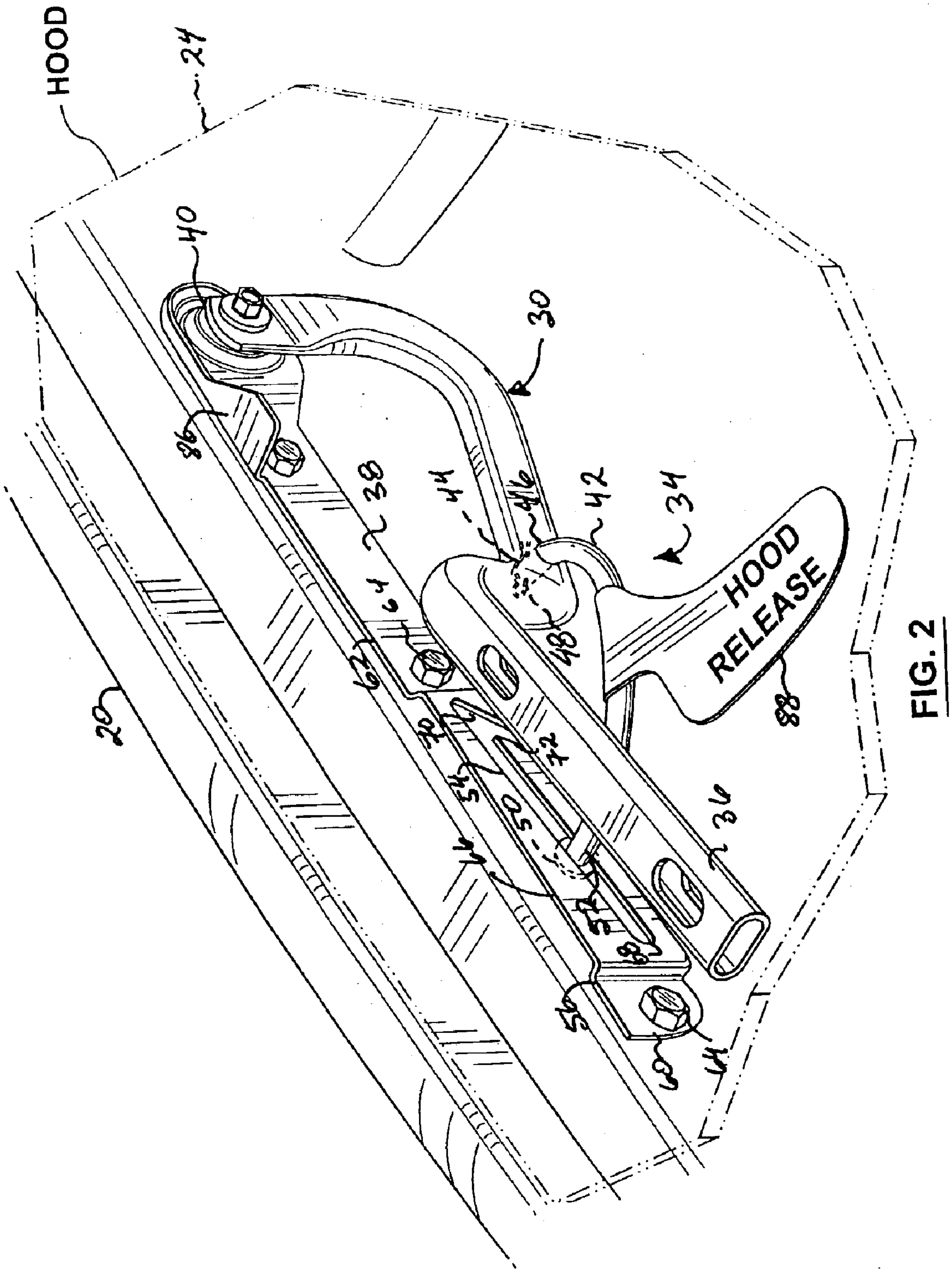
FIG. 2 is a perspective view of the prop assembly in accordance with the invention coupled to a hood and drawn in a retracted position.

As can be seen more clearly from FIG. 2, the closure hinge 30 has a movable component 36 which is a fixed to the hood assembly 24 and a fixed component 38 which is mounted to a front fender forming part of the vehicle body 20. The two components 36, 38 are rotatably coupled at a hinge joint generally indicated by reference numeral 40. It will be understood that the closure hinge 32 on the opposite side of the vehicle will have a similar construction. In FIG. 2 the hood assembly 24 is shown in chain-dotted outline but in the remaining figures it is omitted for simplicity in the drawings.

The prop assembly 34 in accordance with the invention includes a rigid elongated prop 42 which is illustrated in the form of a bowed metal rod. The rod has a hinged end 44 drawn in chain-dotted outline which is rotatably coupled to the movable component 36 of the closure hinge 30 and is received in an aperture 46 formed in an elbow portion of the closure hinge. A cotter pin 48 (drawn in chain-dotted line) is shown traversing the hinged end 44 of the prop to secure the prop 42 and prevent the prop from becoming disengaged from the closure hinge 30.

Figure 4:
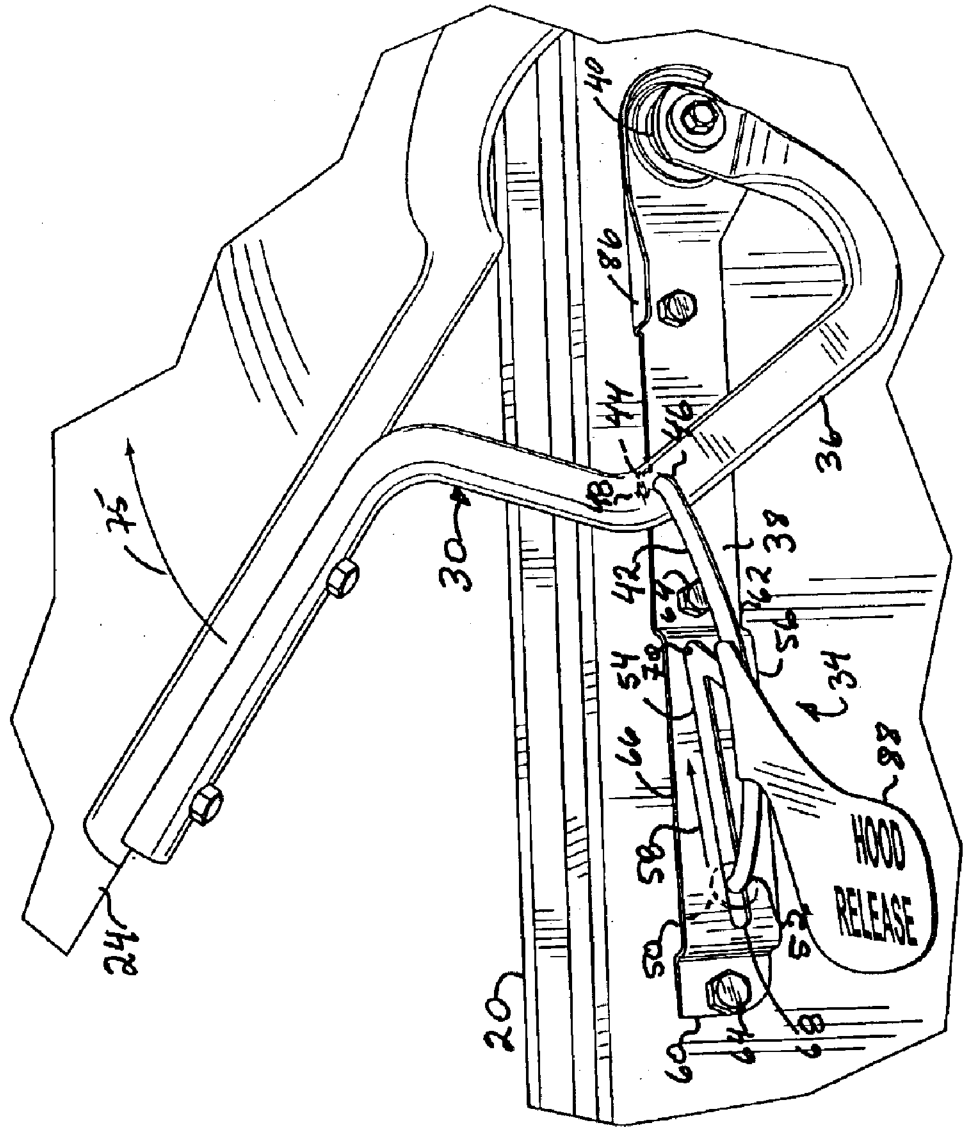
FIG. 4 is a similar view to FIG. 3 showing the prop assembly in a partially extended position.

The other end of the prop 42, remote from the hinged end 44, is a free end 52 that has an enlarged termination 50 which could be formed by swaging the rod or otherwise attaching a suitable termination. The free end 52 adjacent the termination 50 will slide in a guide slot 54 formed in a bracket 56 as indicated by arrow 58 in FIG. 4. The rod is bowed between its ends so as to space it from the vehicle fender body 20 and to minimize the likelihood of pinching fingers or appendages between the prop assembly 34 and the body 20.

Conveniently, the bracket 56 is made integrally with the fixed component 38 of the closure hinge 30 and consists of a plate having opposite ends 60, 62 mounted flush with the vehicle body 20 and secured by fasteners 64. An intermediate portion of the bracket 56 indicated by reference numeral 66 is spaced from the fender body 20 to accommodate the enlarged termination 50 of the prop 42.

The guide slot 54 is formed in the intermediate portion 66 and has a low friction coating which extends between a distal end 68 and a proximal end 70 of the guide slot both of which are spaced forwardly from the hinge joint 40 and the hinged end 44 of the prop 42. It will be seen from the drawings that the proximal end 70 which is nearest to the hinge joint 40 is somewhat higher (as drawn) than the distal end 68 so that the guide slot has a downward slope. The significance of this feature will be described in somewhat more detail below. In addition, the proximal end 70 has a downwardly and forwardly extending detent 72 (seen more clearly in FIG. 5) which is a adapted to capture the free end 52 of the prop 42 in a stable rest in position with the hood assembly 24 fully extended.

The function and operation of the prop assembly will now be described step by step as the hood assembly 24 progressively moves between a retracted position closing the engine compartment to an extended position removed from the engine compartment and is returned to the retracted position.

Figure 3:
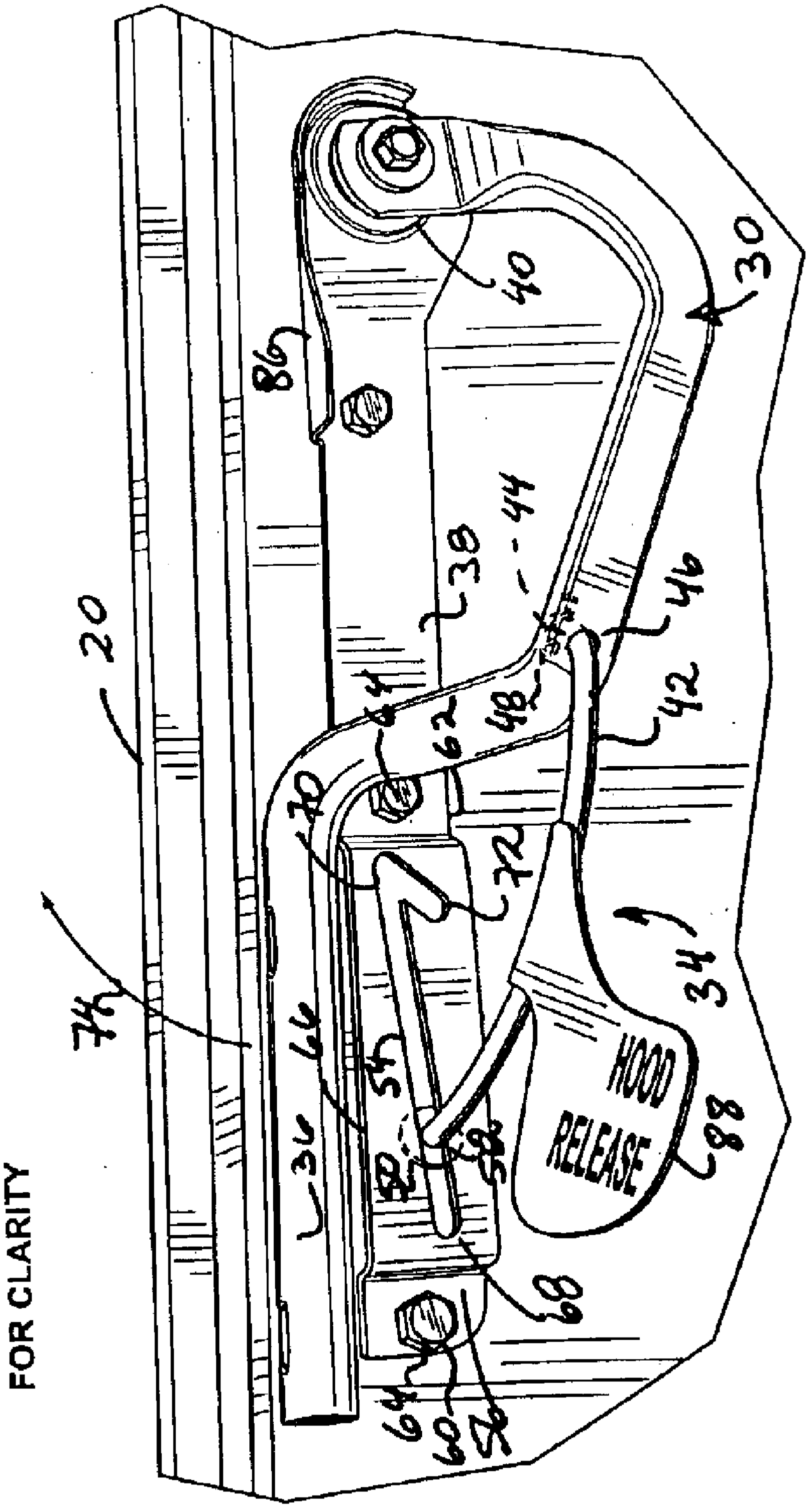
FIG. 3 is a side elevation view of the prop assembly of FIG. 2.

As will be seen in FIG. 3, the hood assembly 24 is initially moved into an upward arc as indicated by arrow 74. Continuing this upward arcuate motion as shown by arrow 75, the free end 52 of the prop is caused to slide in a straight path guided by the guide slot 54 as indicated by arrow 58 in FIG. 4. During such translational motion of the prop 42 along the guide slot 54, the hinged end 44 of the prop 42 pivots inside the aperture 46 to subtend an acute angle indicated by arrow 76 in FIG. 5.

Figure 5:
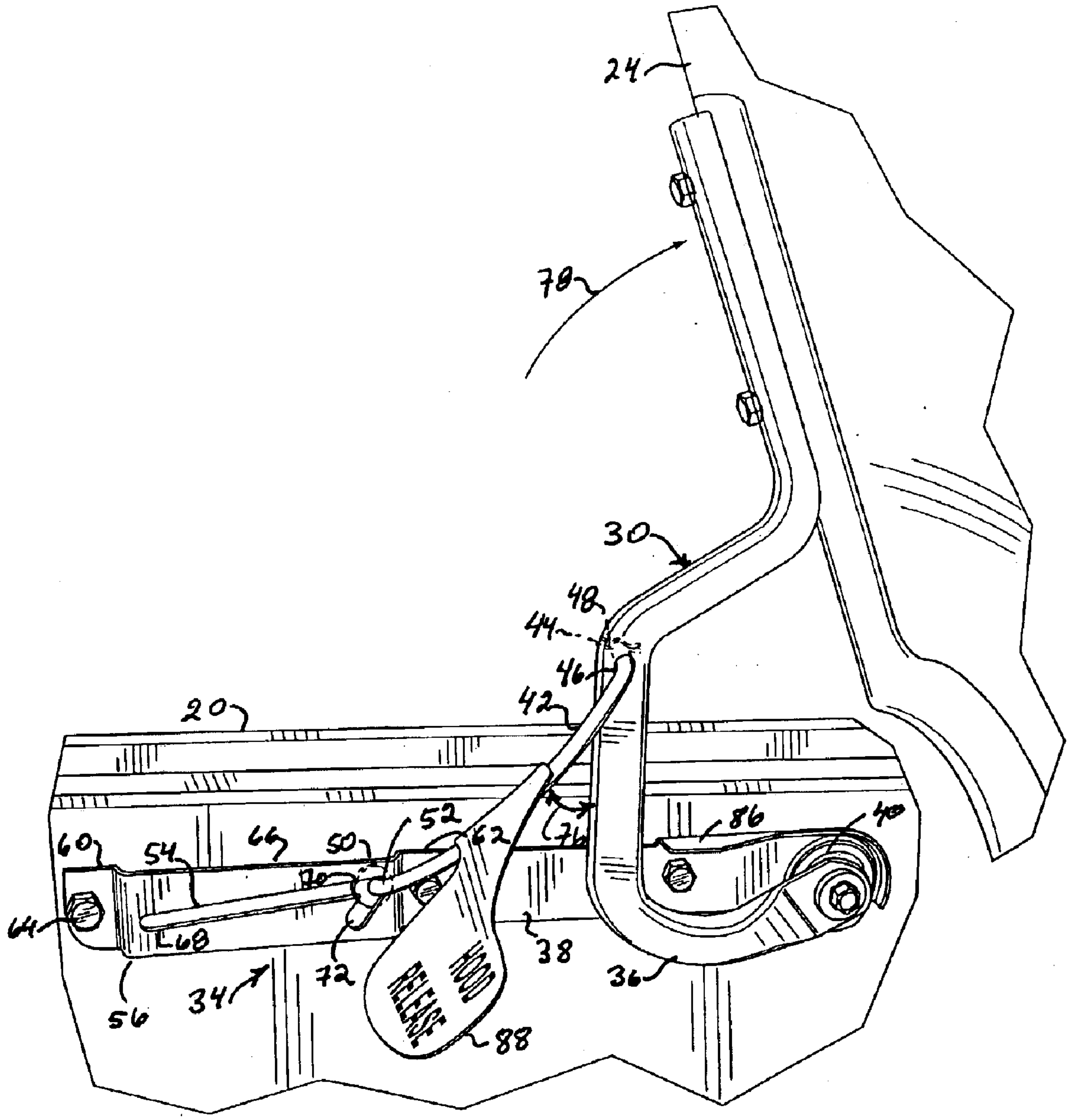
FIG. 5 is a similar view to FIG. 4 showing the prop assembly in a fully extended position.
Figure 6:
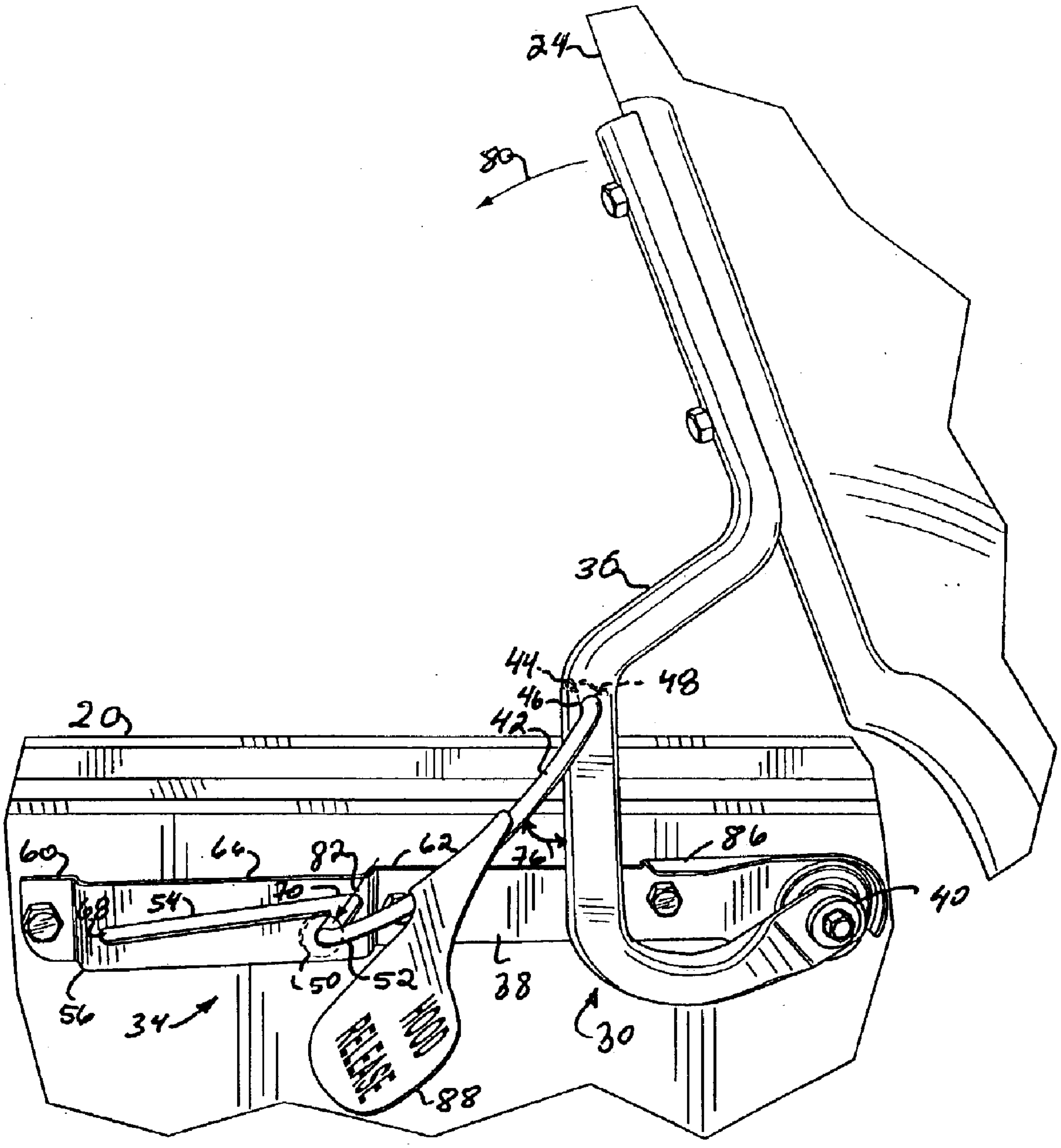
FIG. 6 is a similar view to FIG. 5 showing the prop assembly in a stable rest position with the hood fully extended.

Continued upward motion of the hood assembly 24 as indicated by arrow 78 in FIG. 5 brings the free end 52 of the prop 42 to engage the proximal end 70 of the guide slot 54. In this configuration of the prop assembly 34, the prop 42 has a tendency to swing toward the movable component 36 of the closure hinge 30 in order to find a neutral balanced position. Accordingly, the prop 42 bears against a proximal edge of the detent 72. Releasing the hood assembly 24 as indicated by arrow 80 in FIG. 6 causes the free end 52 of the prop 42 to bear against the proximal portion of the detent 72 and to move downwardly as indicated by arrow 82 until it comes to rest in the bottom end of the detent 72.

Figure 7:
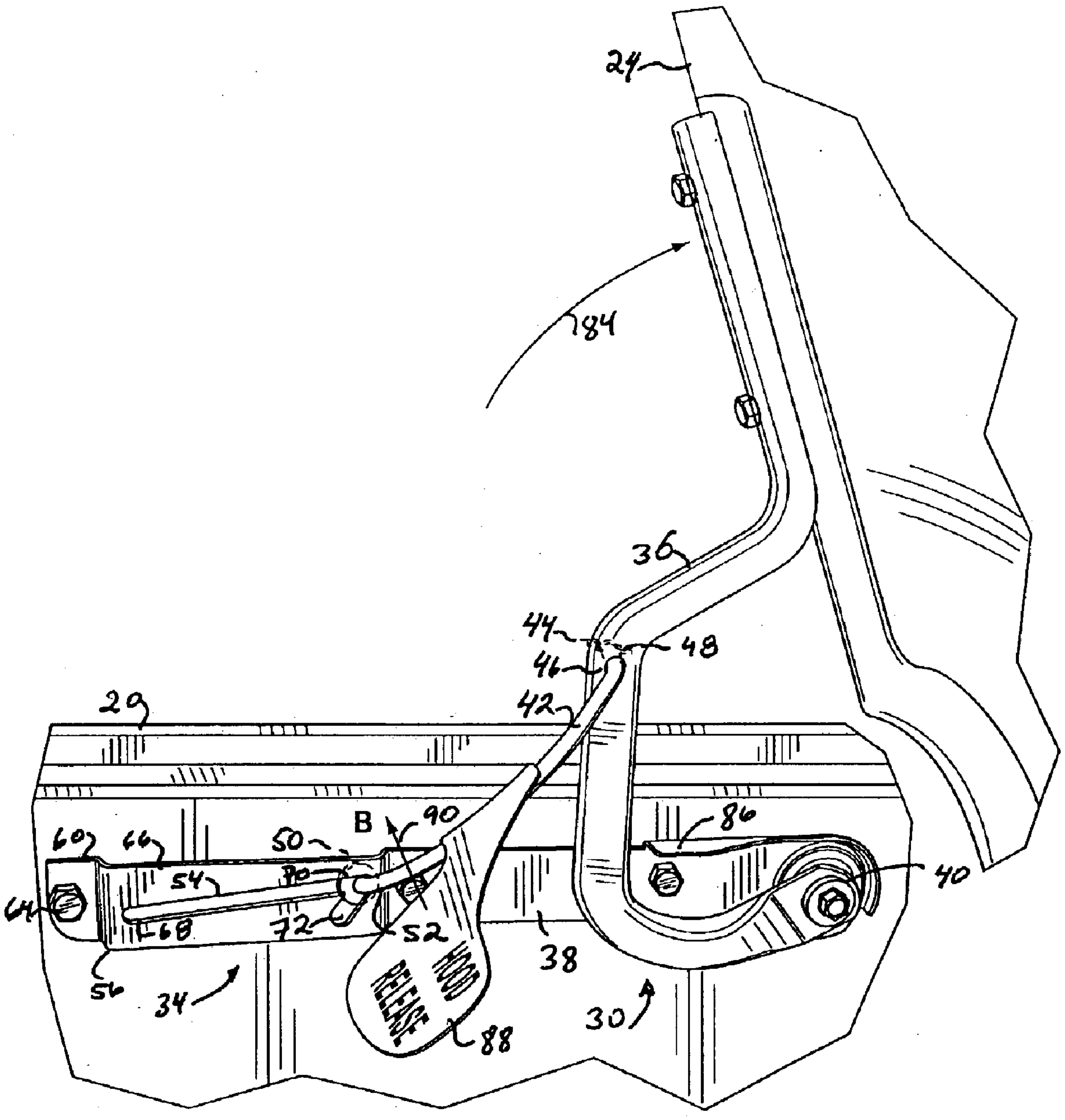
FIG. 7 is a similar view to FIG. 6 showing the prop assembly being moved into a hood release position.

In order to return the hood assembly 24 into the retracted position to close the body opening 22, the hood assembly 24 must first be moved into a fully extended position as indicated by arrow 84 in FIG. 7. The fully extended position is limited by a flange 86 formed in the fixed component 38 of the closure hinge 30. This motion returns the free end 52 of the prop 42 to the proximal end 70 of the guide slot 54. However, in order to engage the free end 52 of the prop 42 into the guide slot 54, the prop 42 must be moved forwardly to free the prop from the detent 72 and this is manually assisted by a lifting tab 88 labeled "HOOD RELEASE" which is attached to the prop 42. The upward motion of the lifting tab 88 is indicated in FIG. 7 by arrow 90.

Figure 8:
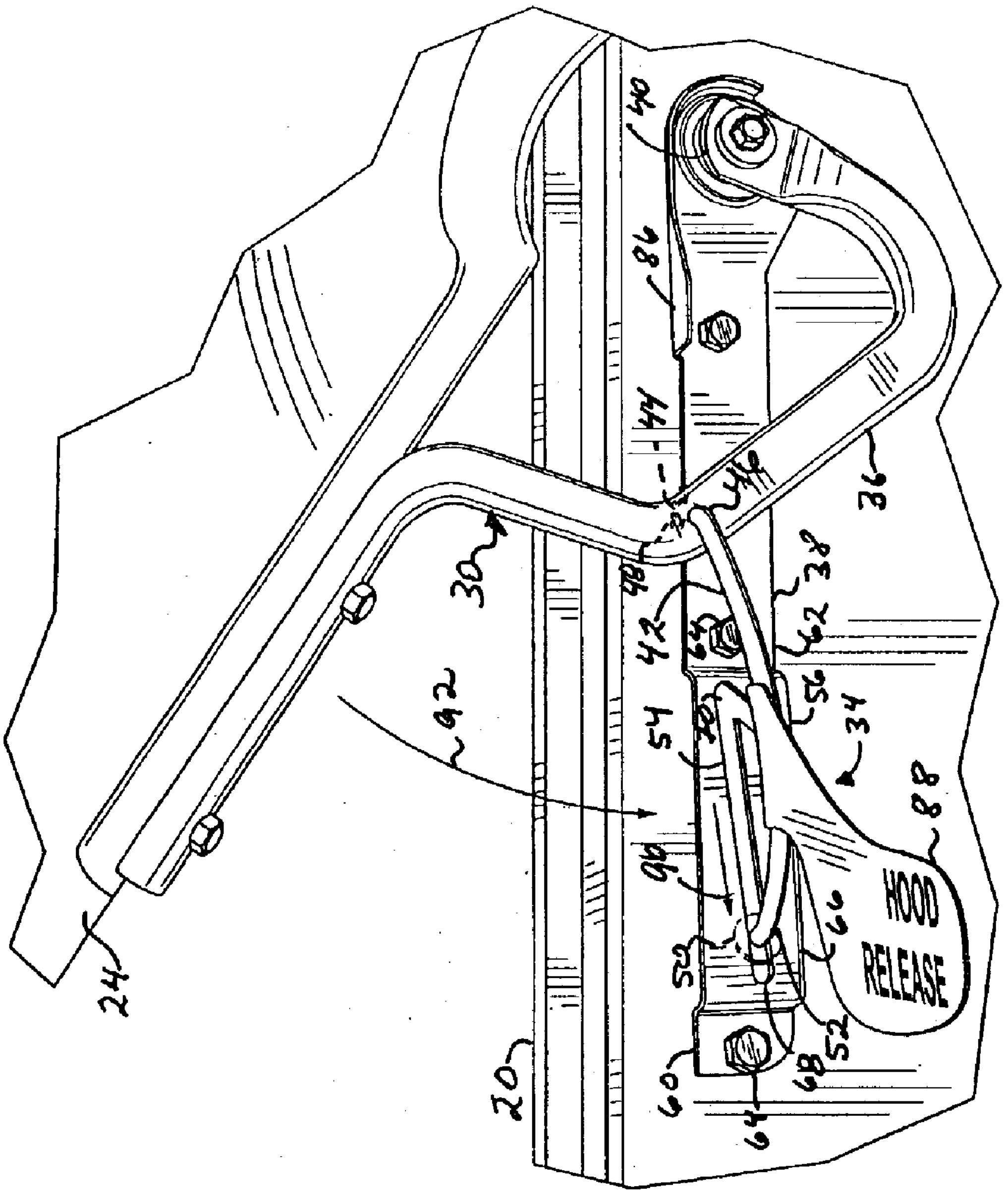
FIG. 8 is a similar view to FIG. 7 showing the prop assembly in a partially retracted position of the hood.
Figure 9:
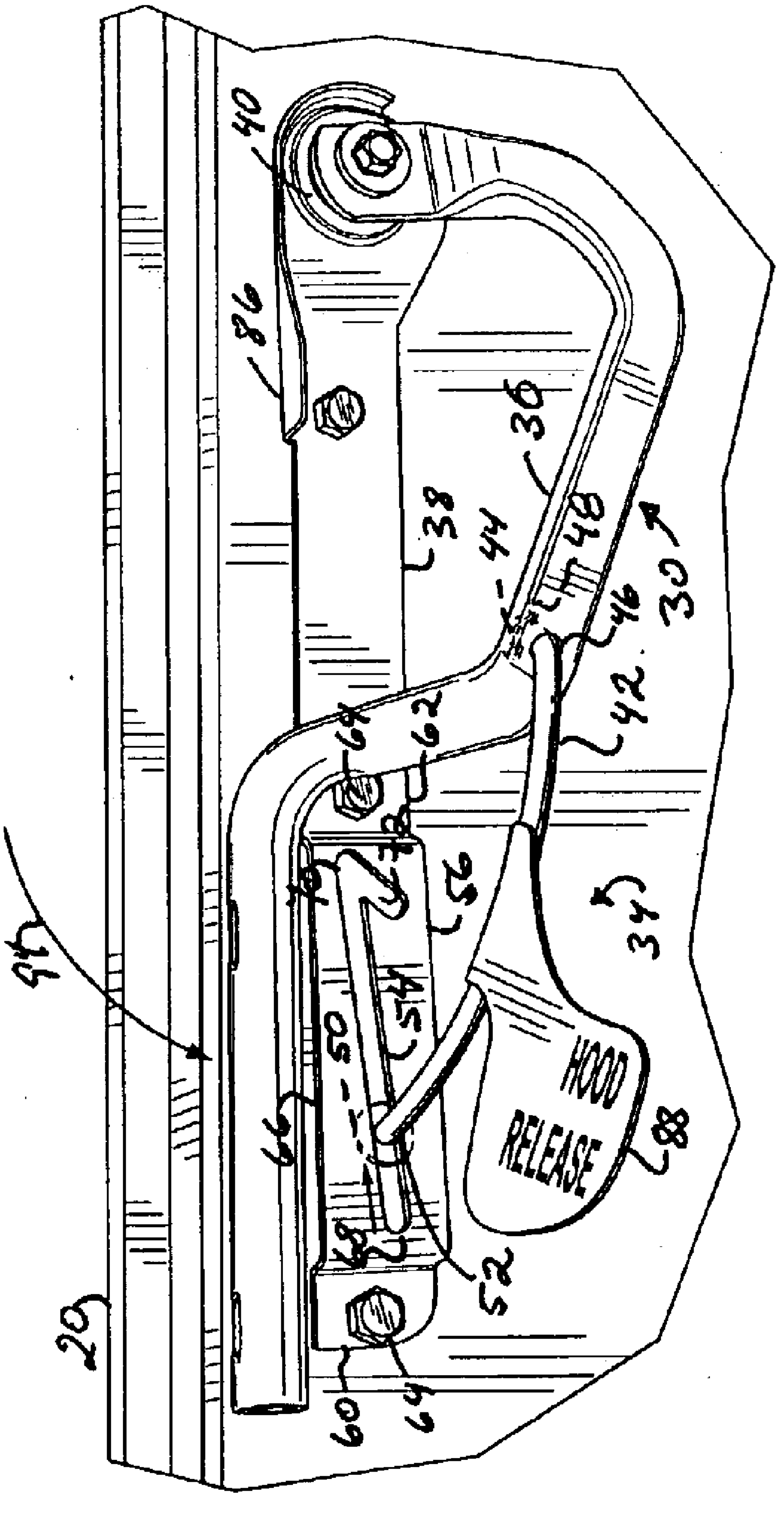
FIG. 9 is a similar view to FIG. 8 showing the prop assembly in a fully retracted position.

Once the free end 52 of the prop 42 is engaged in the guide slot 54, the hood assembly 24 is returned to a fully retracted position as indicated by arrows 92, 94 in FIGS. 8 and 9. Meanwhile, the free end 52 of the prop 42 slides downwardly and forwardly to the distal end 68 of the guide slot 54 as indicated by arrow 96 and this motion is partially assisted by gravity as the free end 52 slides on the downward slope of the guide slot 54.

It will be therefore be appreciated that moving the hood assembly or closure panel to an extended position requires a single motion by an operator using only one hand. Once fully extended, release of the closure panel will automatically bring the closure panel to a stable rest position. To return the closure panel to a retracted position, the panel must positively be extended and the prop urged upwardly to engage the guide slot, an unlikely combination which minimizes the possibility of the closure panel accidentally returning to a retracted position.

Several variations may be made to the above-described preferred embodiment of the invention with the scope of the appended claims. In particular, the hinged end of the prop could be attached to the closure panel itself instead of the closure hinge.

In addition, the shape of the prop and the material of construction of the prop may change considerably to suit the intended application and the nature of the materials which are available. Such changes are considered choices of design which do not materially affect the operation of a prop assembly made in accordance with the invention. Similarly, the nature of the bracket forming the guide slot may be varied and the guide slot may be formed integrally in the body itself without an auxiliary bracket being provided.

What is claimed is:

1. Prop assembly for temporarily supporting a closure panel in an extended position removed from an opening, the closure panel and a body defining said opening being coupled by a closure hinge, the prop assembly having

- a rigid elongated prop having a hinged end for coupling to one of said closure hinge and closure panel, and a free end slidable in a guide slot formed in a bracket adapted to be mounted to the body;
- the guide slot having a distal end and a proximal end spaced forwardly from said hinged end, the guide slot being adapted to guide said free end of the rigid elongated prop as the free end slides between said distal end of the guide slot and the proximal end of the guide slot when the closure panel is moved between a retracted position closing the opening and an extended position removed from the opening, respectively;
- the proximal end of the guide slot having a downwardly extending detent adapted to capture the free end of the rigid elongated prop in the extended position of the closure panel; and
- the bracket consisting of a plate having opposite ends adapted to be mounted flush with the body and an intermediate portion adapted to be spaced from the body, the intermediate portion having the guide slot formed therein.

2. Prop assembly according to claim 1 in which the free end of the rigid elongated prop has an enlarged termination whereby the free end of the rigid elongated prop is captured between the bracket and the body.

3. Prop assembly according to claim 1 in which the rigid elongated prop is bowed between its ends so as to be spaced from the body.

4. Prop assembly according to claim 1 in which the rigid elongated prop has a lifting tab for freeing the free end of the rigid elongated prop from the detent and to release the closure panel so that the closure panel may be brought to a retracted position closing the opening.

5. Prop assembly for temporarily supporting a closure panel in an extended position removed from an opening, the closure panel and a body defining said opening being coupled by a closure hinge, the prop assembly having a rigid elongated prop having a hinged end for coupling to one of said closure hinge and closure panel, and a free end slidable in a guide slot, the rigid elongated prop being bowed between its ends so as to be spaced from the body;

the guide slot having a distal end and a proximal end spaced forwardly from said hinged end, the guide slot being adapted to guide said free end of the rigid elongated prop as the free end slides between said distal end of the guide slot and the proximal end of the guide slot when the closure panel is moved between a retracted position closing the opening and an extended position removed from the opening, respectively;

the proximal end of the guide slot having a downwardly extending detent adapted to capture the free end of the prop in the extended position of the closure panel.

6. Prop assembly for temporarily supporting a closure panel in an extended position removed from an opening, the closure panel and a body defining said opening being coupled by a closure hinge, the prop assembly having a rigid elongated prop having a hinged end for coupling to one of said closure hinge and closure panel, and a free end slidable in a guide slot, the rigid elongated prop having a lifting tab for freeing the free end of the rigid elongated prop from the detent and to release the closure panel so that the closure panel may be brought to a retracted position closing the opening;

the guide slot having a distal end and a proximal end spaced forwardly from said hinged end, the guide slot being adapted to guide said free end of the rigid elongated prop as the free end slides between said distal end of the guide slot and the proximal end of the guide slot when the closure panel is moved between a retracted position closing the opening and an extended position removed from the opening, respectively;

the proximal end of the guide slot having a downwardly extending detent adapted to capture the free end of the prop in the extended position of the closure panel.

* * * * *